(12) United States Patent
Yamagami et al.

(10) Patent No.: US 10,134,065 B2
(45) Date of Patent: Nov. 20, 2018

(54) BILLING CHARGE CALCULATION METHOD FOR USE IN SHEET MANUFACTURING APPARATUS, BILLING CHARGE CALCULATION APPARATUS, AND BILLING SYSTEM

(71) Applicant: SEIKO EPSON CORPORATION, Tokyo (JP)

(72) Inventors: Toshiaki Yamagami, Shiojiri (JP); Seiichi Taniguchi, Asahi-mura (JP)

(73) Assignee: Seiko Epson Corporation, Tokyo (JP)

( * ) Notice: Subject to any disclaimer, the term of this patent is extended or adjusted under 35 U.S.C. 154(b) by 505 days.

(21) Appl. No.: 14/993,838

(22) Filed: Jan. 12, 2016

(65) Prior Publication Data

US 2016/0239883 A1   Aug. 18, 2016

(30) Foreign Application Priority Data

Feb. 16, 2015   (JP) ................................ 2015-027284

(51) Int. Cl.
  *G06Q 30/02*   (2012.01)
  *G06Q 30/04*   (2012.01)
  *G06Q 50/04*   (2012.01)

(52) U.S. Cl.
  CPC ............. *G06Q 30/04* (2013.01); *G06Q 50/04* (2013.01); *G06Q 30/0283* (2013.01); *Y02P 90/30* (2015.11)

(58) Field of Classification Search
  CPC .................................................. G06Q 30/0283
  See application file for complete search history.

(56) References Cited

U.S. PATENT DOCUMENTS

| 8,882,965 | B2 | 11/2014 | Yamagami et al. | |
| 9,194,081 | B2 | 11/2015 | Yamagami | |
| 2003/0187808 | A1* | 10/2003 | Alfred ................ | G06Q 30/0283 705/400 |
| 2009/0319443 | A1* | 12/2009 | Nakajima .............. | G03G 21/02 705/400 |

FOREIGN PATENT DOCUMENTS

JP   2012-144819   8/2012

* cited by examiner

Primary Examiner — A Hunter Wilder
(74) Attorney, Agent, or Firm — Workman Nydegger

(57) ABSTRACT

A billing charge calculation method for use in a sheet manufacturing apparatus that manufactures a sheet using a material including a fiber, includes: acquiring a quantity of output of the manufactured sheets; and calculating a billing charge according to the quantity of the output of the sheets, in which, in the calculating of the billing charge, a charge that includes a quantity-based charge which is obtained by multiplying the quantity of the output of the sheets by a charge per unit quantity is calculated as the billing charge.

2 Claims, 9 Drawing Sheets

| SHEET TYPE | BINDER | COLORING AGENT | FUNCTIONAL AGENT 1 | FUNCTIONAL AGENT 2 |
|---|---|---|---|---|
| SHEET A | ○○YEN/m² | △△YEN/m² | ▽▽YEN/m² | □□YEN/m² |
| SHEET B | ◉◉YEN/m² | ▲▲YEN/m² | ▼▼YEN/m² | ▦▦YEN/m² |
| SHEET C | ⊛⊛YEN/m² | ▲▲YEN/m² | ▼▼YEN/m² | ▦▦YEN/m² |

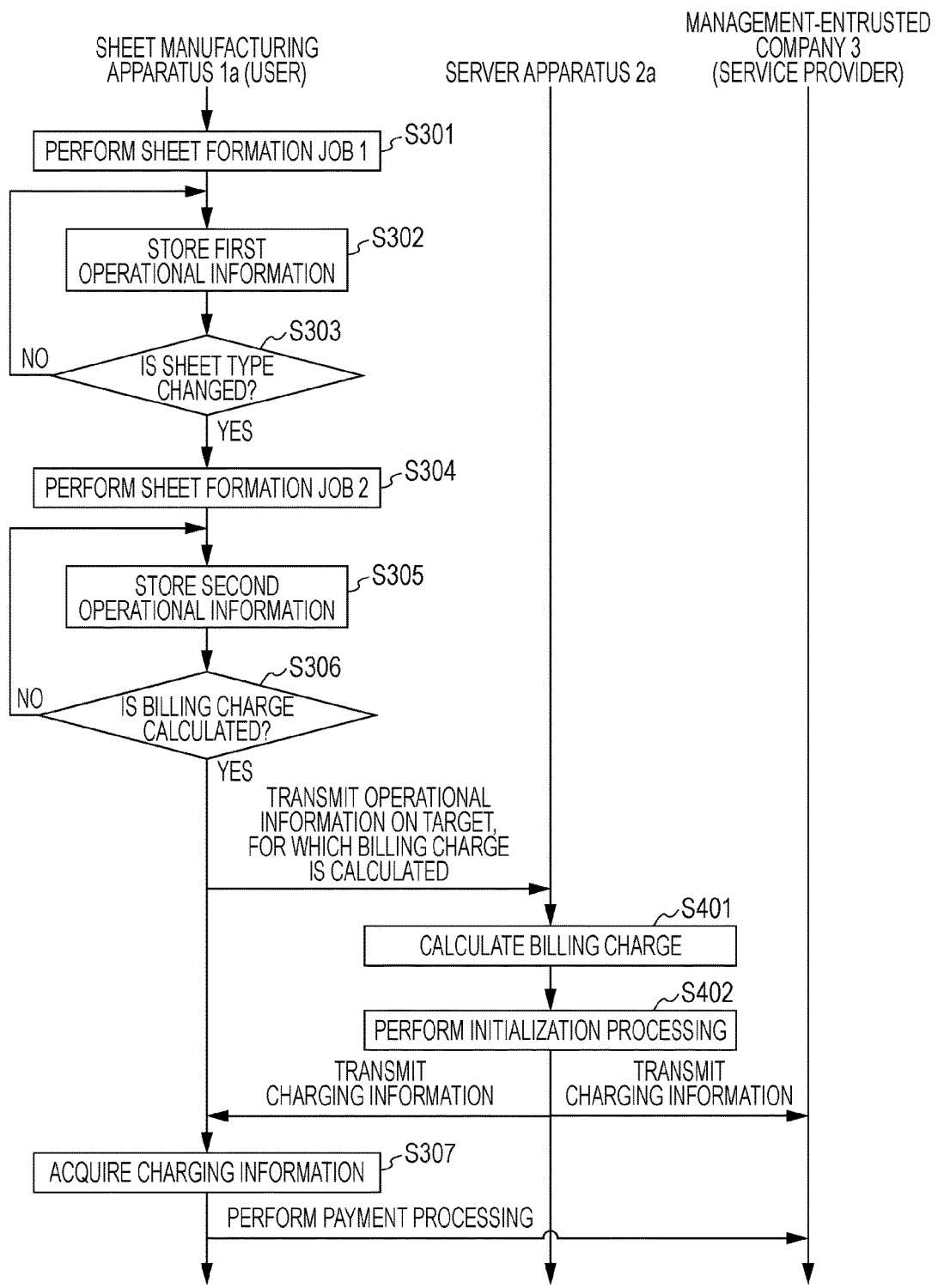

BILLING CHARGE CALCULATION METHOD FOR USE IN SHEET MANUFACTURING APPARATUS, BILLING CHARGE CALCULATION APPARATUS, AND BILLING SYSTEM

BACKGROUND

1. Technical Field

The present invention relates to a billing charge calculation method, a billing charge calculation apparatus and a billing system, which pertain particularly to a sheet manufacturing apparatus.

2. Related Art

A paper recycling device is known that crushes and defibrates waste paper into defibrated material, and forms paper with the defibrated material (for example, refer to JP-A-2012-144819).

Incidentally, in a sheet manufacturing apparatus that forms a sheet using a piece of waste paper as a material, because a quantity (a quantity of input) of materials such as the pieces of waste paper or consumable materials such as additives, which are used for the formation of the sheets, is not necessarily consistent with a quantity of output of the sheets that are actually formed and output, there is a need for a billing method to alleviate a sense of disadvantage that a user feels.

SUMMARY

The invention can be realized in the following aspects or application examples.

Application Example 1

According to this application example, there is provided a billing charge calculation method for use in a sheet manufacturing apparatus that manufactures a sheet using a material including a fiber, the method including: acquiring a quantity of output of the manufactured sheets; and calculating a billing charge according to the quantity of the output of the sheets, in which, in the calculating of the billing charge, a charge that includes a quantity-based charge which is obtained by multiplying the quantity of the output of the sheets by a charge per unit quantity is calculated as the billing charge.

With this configuration, the billing is performed according to the quantity of the sheets that are actually manufactured in the sheet manufacturing apparatus. That is, the billing is not performed according to the quantity of the consumable materials that are used in processes of manufacturing the sheets. Thus, a sense of disadvantage that a customer feels can be alleviated, and the method of reasonably calculating the billing charge can be provided.

Application Example 2

In the billing charge calculation method for use in a sheet manufacturing apparatus according to the application example, in the calculating of the billing charge, in a case where the quantity of the output of the sheets is a predetermined quantity or less, a fixed charge of a predetermined amount of money may be set as the billing charge, and in the calculating of the billing charge, in a case where the quantity of the output of the sheets exceeds the predetermined quantity, a charge that is obtained by adding the quantity-based charge, which is obtained by multiplying by the charge per unit quantity the quantity of the output of the sheets by which the predetermined quantity is exceeded, to the fixed charge may be calculated as the billing charge.

With this configuration, because the billing charge is calculated as a combination of the fixed charge and the quantity-based charge according to a predetermined quantity of the sheets, the sense of disadvantage that the user who uses the sheet manufacturing apparatus with high frequency feels can be alleviated as well.

Application Example 3

In the billing charge calculation method for use in a sheet manufacturing apparatus according to the application example, in the acquiring of the quantity of the output, the quantity of the output of the sheets may be the number of the sheets that are manufactured by the sheet manufacturing apparatus.

With this configuration, the charge can be easily calculated based on the number of the sheets that are actually manufactured in the sheet manufacturing apparatus.

Application Example 4

In the billing charge calculation method for use in a sheet manufacturing apparatus according to the application example, in the acquiring of the quantity of the output, the quantity of the output of the sheets may be a weight of the sheets that are manufactured by the sheet manufacturing apparatus.

With this configuration, the charge can be easily calculated based on the weight of the sheet per one sheet that is actually manufactured in the sheet manufacturing apparatus.

Application Example 5

In the billing charge calculation method for use in a sheet manufacturing apparatus according to the application example, in the acquiring of the quantity of the output, the quantity of the output of the sheets may be an area of the sheets that are manufactured by the sheet manufacturing apparatus.

With this configuration, the charge can be easily calculated from the area of the sheets that are actually manufactured in the sheet manufacturing apparatus.

Application Example 6

According to this application example, there is provided a billing charge calculation apparatus for a sheet manufacturing apparatus that manufactures a sheet using a material including a fiber, the apparatus including: an acquisition unit that acquires a quantity of output of manufactured sheets; and a calculation unit that calculates a billing charge according to the quantity of the output of the sheets, in which the calculation unit calculates a charge that includes a quantity-based charge which is obtained by multiplying the quantity of the output of the sheets by a charge per unit quantity, as the billing charge.

With this configuration, the billing is performed according to the quantity of the sheets that are actually manufactured in the sheet manufacturing apparatus. That is, the billing is not performed according to the quantity of the consumable materials that are used in the processes of manufacturing the sheets. Thus, the sense of disadvantage that the customer feels can be alleviated, and the apparatus for reasonably calculating the billing charge can be provided.

Application Example 7

In the billing charge calculation apparatus for a sheet manufacturing apparatus, according to the application example, in a case where the quantity of the output of the sheets is a predetermined quantity or less, the calculation unit may set a fixed charge of a predetermined amount of money, as the billing charge, and in a case where the quantity of the output of the sheets exceeds the predetermined quantity, the calculation unit may calculate a charge that is obtained by adding the quantity-based charge, which is obtained by multiplying by the charge per unit quantity the quantity of the sheets by which the predetermined quantity is exceeded, to the fixed charge, as the billing charge.

With this configuration, because the billing charge is calculated as a combination of the fixed charge and the quantity-based charge according to a predetermined quantity of the sheets, the sense of disadvantage that the user who uses the sheet manufacturing apparatus with high frequency feels can be alleviated as well.

Application Example 8

According to this application, there is provided a billing system for a sheet manufacturing apparatus, including: the sheet manufacturing apparatus that manufactures a sheet using a material including a fiber; and a host device that is connected to the sheet manufacturing apparatus in such a manner that communication is possible, in which the sheet manufacturing apparatus includes a detection unit that detects information indicating a quantity of manufactured sheets, in which the host device includes an acquisition unit that acquires information indicating the quantity of the manufactured sheets from the sheet manufacturing apparatus, and a calculation unit that calculates a billing charge according to the quantity of the manufactured sheets, and in which the calculation unit calculates a charge that includes a quantity-based charge which is obtained by multiplying the quantity of the manufactured sheets by a charge per unit quantity, as the billing charge.

With this configuration, the billing is performed according to the quantity of the sheets that are actually manufactured in the sheet manufacturing apparatus. That is, the billing is not performed according to the quantity of the consumable materials that are used in the processes of manufacturing the sheets. Thus, the sense of disadvantage that the customer feels can be alleviated, and the system for reasonably calculating the billing charge can be provided.

Application Example 9

In the billing system for a sheet manufacturing apparatus, according to the application example, in a case where the quantity of the manufactured sheets is a predetermined quantity or less, the calculation unit may set a fixed charge of a predetermined amount of money, as the billing charge, and in a case where the quantity of the manufactured sheets exceeds the predetermined quantity, the calculation unit may calculate a charge that is obtained by adding the quantity-based charge, which is obtained by multiplying by the charge per unit quantity the quantity of the manufactured sheets by which the predetermined quantity is exceeded, to the fixed charge, as the billing charge.

With this configuration, because the billing charge is calculated as a combination of the fixed charge and the quantity-based charge according to a predetermined quantity of the sheets, the sense of disadvantage that the user who uses the sheet manufacturing apparatus with high frequency feels can be alleviated as well.

BRIEF DESCRIPTION OF THE DRAWINGS

The invention will be described with reference to the accompanying drawings, wherein like numbers reference like elements.

FIG. 9 is a flowchart illustrating a billing charge calculation method for use in the sheet manufacturing apparatus according to the second embodiment.

DESCRIPTION OF EXEMPLARY EMBODIMENTS

Figure 1:
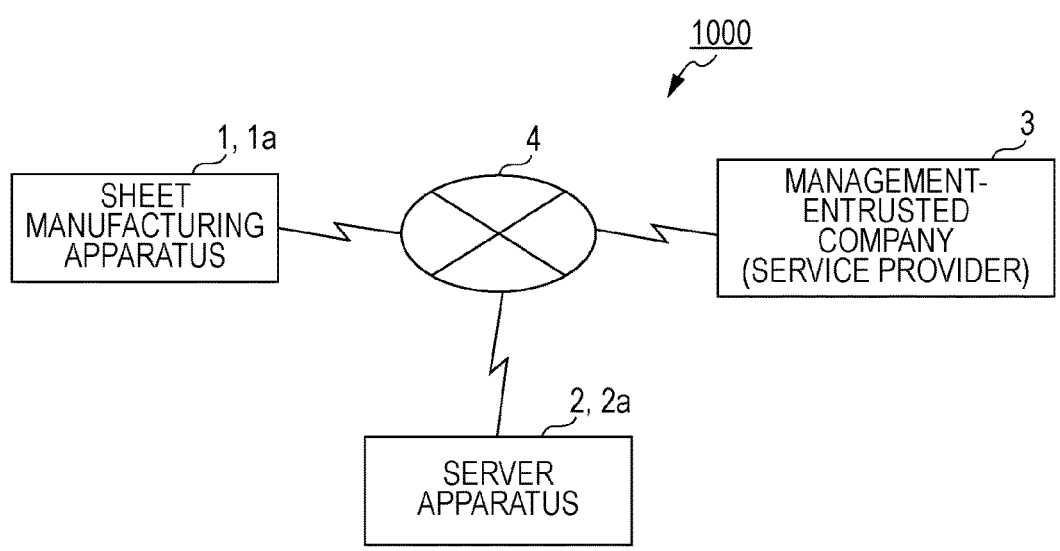
FIG. 1 is a configuration diagram illustrating a configuration of a billing system for a sheet manufacturing apparatus according to a first embodiment.

First and second embodiments of the invention will be described below referring to the drawings. Moreover, because members and the like in the following drawings are enlarged to such an extent that they are recognizable, their scales are different from those in the real world.

First Embodiment

First, a configuration of a billing system for a sheet manufacturing apparatus will be described. FIG. 1 is a configuration diagram illustrating the billing system for the sheet manufacturing apparatus. As illustrated in FIG. 1, a billing system 1000 for the sheet manufacturing apparatus (hereinafter referred to as the billing system 1000) has a sheet manufacturing apparatus 1 that manufactures a sheet from a material which includes a fiber, and a server apparatus 2 as a host device that is connected to the sheet manufacturing apparatus 1 in such a manner that communication is possible. The sheet manufacturing apparatus 1 and the server apparatus 2 are connected to each other in such a manner that the communication is possible with a communication circuit 4. Furthermore, a management-entrusted company (a service provider) 3 that provides a service relating to the sheet manufacturing apparatus 1 is connected to the server apparatus 2 through the communication circuit 4 in such a manner that communication is possible.

Moreover, an example is described in which, in the billing system 1000 according to the embodiment, one sheet manufacturing apparatus 1 is connected to the communication circuit 4, but the billing system 1000 is not limited to this configuration. A configuration may be employed in which multiple sheet manufacturing apparatuses 1 are connected to the communication circuit 4 and it is possible for each of the sheet manufacturing apparatuses 1 to communicate with the server apparatus 2. Furthermore, a configuration of the communication circuit 4 is not particularly limited. If the communication among the sheet manufacturing apparatus 1, the server apparatus 2, and a management-entrusted company 3 is possible, it does not matter whether the communication is performed in a wired or wireless manner.

Next, a configuration of the sheet manufacturing apparatus is described. The sheet manufacturing apparatus, for example, is an apparatus that manufactures a new sheet Pr from a material (a degradable fiber) Pu which includes a fiber, such as a pure pulp sheet or a piece of waste paper.

Figure 2:
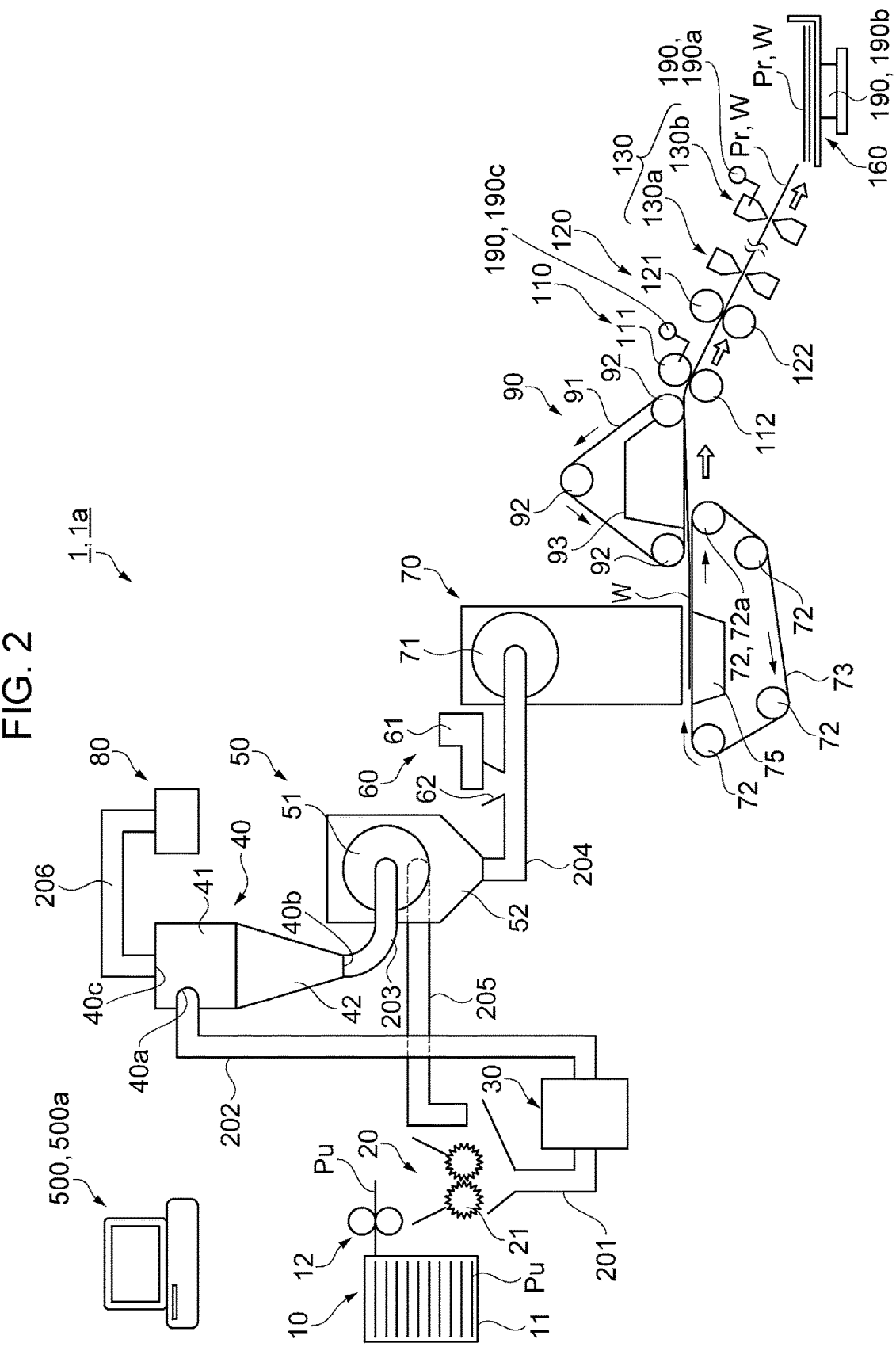
FIG. 2 is a schematic diagram illustrating a configuration of the sheet manufacturing apparatus according to the first embodiment.

FIG. 2 is a schematic diagram illustrating a configuration of the sheet manufacturing apparatus according to the present embodiment. As illustrated in FIG. 2, the sheet manufacturing apparatus 1 includes a supply unit 10, a crushing unit 20, a defibrating unit 30, a classification unit 40, a screening unit 50, an additive feeding unit 60, an accumulation unit 70, a heating and pressurizing unit 120, and a detection unit 190 (190a, 190b, and 190c), and the like. Furthermore, the sheet manufacturing apparatus 1 includes a control unit 500 that controls these members.

The supply unit 10 supplies a sheet of waste paper Pu and the like as materials to the crushing unit 20. The supply unit 10, for example, includes a tray 11 in which multiple sheets of waste paper Pu are placed on top of one another, an automatic feeding mechanism 12 that is capable of successively feeding the sheets of waste paper Pu in the tray 11 to the crushing unit 20, and the like. As the piece of the waste paper Pu that is supplied to the sheet manufacturing apparatus 1, for example, there are an A4-sized sheet of paper that is currently mainly used in an office, and the like.

The crushing unit 20 cuts the piece of waste paper Pu that is supplied, into several centimeter-sized pieces of paper. The crushing unit 20 includes a crushing blade 21. The crushing unit 20 is configured as if it were an apparatus that has a blade of which a cutting width is greater than a cutting width of a blade of a normal shredder. Thus, the supplied pieces of waste paper can be easily cut into pieces of paper. Then, the pieces of paper that result from the cutting are supplied into the defibrating unit 30 through a pipe line 201.

The defibrating unit 30 degrades a material, which includes a fiber, in the air. Specifically, the defibrating unit 30 includes a rotary cutting blade (not illustrated) that rotates, and performs defibrating processing that disentangles the pieces of paper, which are supplied from the crushing unit 20, into fiber fragments. In the present application, what is defibrated in the defibrating unit 30 is referred to as the defibration objects, and what goes through the defibrating processing in the defibrating unit 30 is referred to as the defibrated materials. Moreover, the defibrating unit 30 according to the present embodiment performs the defibrating processing under a dry environment in air (not in liquid). With the defibrating processing by the defibrating unit 30, ink or toner that is ejected onto a sheet of paper for printing, a coating material that is ejected onto the sheet of paper for oozing-prevention and the like, or the like becomes several tens of micrometer-sized grains (hereinafter referred to as "ink grains") and is separated from the fiber. Therefore, the defibrated materials that go out of the defibrating unit 30 are the fiber and the ink grains that are obtained from the pieces of fiber. Then, with a mechanism in which the air current occurs due to the rotation of the rotary cutting blade, the defibrated materials that result from the defibrating are carried by the air current and are transported in the air to the classification unit 40 through the pipe line 202. Moreover, an air current generation apparatus may be separately provided that generates the air current for carrying the defibrated materials resulting from the defibrating in the defibrating unit 30 to the classification unit 40 through the pipe line 202, whenever necessary.

The classification unit 40 classifies introduction materials that are introduced, using the air current. According to the present embodiment, the defibrated materials as the introduction materials are separated into the ink grains and the fiber. With the application of a cyclone classifier, the classification unit 40, for example, can classify the defibrated materials that are transported, into the ink grains and the fiber, using the air current. Moreover, instead of the cyclone, another type of current-air type classifier may be used. In this case, as the current-air classifier other than the cyclone, for example, an elbow jet or eddy classifier or the like is used. The current-air type classifier generates swirling air and performs separation and classification using a difference in centrifugal force that is subject to the size and density of the defibrated material. For this reason, with the adjustment of the speed of the air current and the centrifugal force, a classification point can be adjusted. Thus, the separation into the ink grains having a comparatively low density and the fiber having a much higher density than the ink grains is performed.

The classification unit 40 according to the present embodiment is a cyclone classifier that is a tangent line type. The classification unit 40 is configured from an introduction opening 40a though which the introduction material is introduced from the defibrating unit 30, a cylindrical member 41 to which the introduction opening 40a is attached in the direction of a tangent, a circular truncated cone 42 that is connected directly to the lower portion of the cylindrical member 41, a lower outlet 40b that is provided to a lower portion of the circular truncated cone 42, and an upper exhaust opening 40c for discharging fine power, which is provided to the center of an upper portion of the cylindrical member 41. A diameter of the circular truncated cone 42 decreases as it goes downward in the vertical direction.

In classification processing, a movement of the air current that carries the defibrated materials that are introduced through the introduction opening 40a in the classification unit 40 is changed to a circumference movement in the cylindrical member 41 and the circular truncated cone 42, and this produces centrifugal force that causes the classification. Then, the fiber that has a larger size and a higher density than the ink grains moves to the lower outlet 40b, and the ink grains that have a comparatively small size and a low density are discharged, as fine power, to the upper exhaust opening 40c, along with air. Then, the ink grains are discharged from the upper exhaust opening 40c in the classification unit 40. The, the ink grains that are discharged are collected by a reception member 80 through a pipe line 206 that is connected to the upper exhaust opening 40c in the classification unit 40. On the other hand, classified materials that include the fiber which results from the classification are transported in the air from the lower outlet 40b in the classification unit 40 through a pipe line 203 toward the screening unit 50. The classified material may be transported from the classification unit 40 to the screening unit 50 due to the air current at the time of performing the classification, and may be transported from the classification unit 40 that is positioned in a high position to the screening unit 50 that is positioned in a low position, due to the force of gravity. Moreover, an absorption member or the like for efficiently absorbing a short fiber mixture from the upper exhaust opening 40c may be arranged in the upper exhaust opening 40c in the classification unit 40 or in the pipe line 206. The classification is not precisely performed with a certain size and density serving as a threshold. Furthermore, precise classification into the fiber and the ink grains is not performed. Among the fibers, a comparatively short fiber is discharged from the upper exhaust opening 40c along with the ink grains. Among the ink grains, a comparatively large ink grain is discharged from the lower outlet 40b along with the fiber.

The screening unit 50 allows the classified materials (the defibrated materials) that include the fiber that results from the classification by the classification unit 40 to passes through a sieving member 51 having multiple openings in order to sort the classified materials. Additionally, specifically, the classified materials that include the fiber that results from the classification by the classification unit 40 are sorted into passing materials and residues. The screening unit 50 according to the present embodiment includes a mechanism that, with a rotary movement, disperses the classified materials into the air. Then, the passing material that passes through the opening as a result of the screening by the screening unit 50 is transported from a passing material transportation unit 52 through a pipe line 204 to the accumulation unit 70 side. On the other hand, the residue that does not pass through the opening as a result of the screening by the screening unit 50, returns, again as the degradable fiber, to the defibrating unit 30 through a pipe line 205. Thus, the residue is reused (recycled) without being disposed of.

The passing material that passes through the opening as a result of the screening by the screening unit 50 is transported in the air to the accumulation unit 70 through the pipe line 204. The passing material may be transported by a blower that is not illustrated and that generates the air current, from the screening unit 50 to the accumulation unit 70, and may be transported from the screening unit 50 that is positioned in a high position to the accumulation unit 70 that is positioned in a low position. The additive feeding unit 60 that adds an additive such as a binder (for example, thermoplastic resin or thermosetting resin) to the passing material that is transported is provided between the screening unit 50 and the accumulation unit 70 in the pipe line 204. Moreover, as the additive, in addition to the binder, for example, it is also possible to inject a flame retardant, a whiteness-improving agent, a sheet power increasing agent, a sizing agent, an absorption adjustment agent, an aromatic agent, a deodorant, and the like. These additives are stored in an additive storage unit 61, and, with an injection mechanism not illustrated, are input from an injection opening 62.

It is possible for the materials including the fibers to accumulate in the accumulation unit 70, and at least some of the defibrated materials that result from the defibrating in the defibrating unit 30 accumulate in the air. Specifically, the accumulation unit 70 forms a web W that results from causing the materials which include the fibers or the binders that are input from the pipe line 204, to accumulate, and includes a mechanism that uniformly disperses the fibers into the air. Furthermore, the accumulation unit 70 has a moving portion in which the defibrated materials accumulate as accumulation materials (the web W) while the moving portion is in motion. Moreover, the moving portion according to the present embodiment is configured from a stretching roller 72 and an endless mesh belt 73 on which a mesh that is stretched by the stretching roller 72 is formed. Then, at least one among the stretching rollers 72 rotates about its axis, and thus the mesh belt 73 is made to rotate (move) in one direction. Moreover, the web W according to the present embodiment refers to a configuration form of the material that includes the fibers and the binders. Therefore, even in a case where the form in terms of dimensions and the like changes at the time of applying heat or pressure to the web or of cutting or transmitting the web, an appearance as the web is possible.

First, as the mechanism that uniformly disperses the fibers into the air, a forming drum 71 into which the fibers and the binders are input is arranged in the accumulation unit 70. Then, rotary drive of the forming drum 71 makes it possible to uniformly mix the binders (the additives) with the passing materials (the fibers). A screen that has multiple small holes is provided to the forming drum 71. Then, the rotary drive of the forming drum 71 makes it possible to uniformly mix the binders (the additives) with the passing materials (the fibers) and to uniformly disperse the fibers that pass through the small holes or a mixture of the fiber and the binder into the air.

The mesh belt 73 is arranged below the forming drum 71. Furthermore, a suction apparatus 75, as the absorption member that generates the air current vertically downward, is provided right under the forming drum 71 with the mesh belt 73 in between. With the suction apparatus 75, the fibers that are dispersed into the air can be absorbed on the mesh belt 73.

Then, the fibers and the like that pass through the small holes in the screen of the forming drum 71 accumulate on the mesh belt 73 due to an absorption force by the suction apparatus 75. At this time, a movement of the mesh belt 73 in one direction can make it possible to form the web W that results from causing the fibers and the binders to accumulate in the longitudinal direction. The dispersion from the forming drum 71 and successive movements of the mesh belt 73 form successive webs in the form of a band. Moreover, the mesh belt 73 may be made of metal, resin, or non-woven fabric. As long as the fibers can accumulate on the mesh belt 73 and the air current can pass through the mesh belt 73, the mesh belt 73 may be made of any material. Moreover, when diameters of the holes in the mesh belt 73 are too great, the fibers are caught in the holes in the mesh, and the webs W (the sheet) are unevenly formed. On the other hand, when the diameters of the holes in the mesh belt are too small, it is difficult for the suction apparatus 75 to form the stable air current. For this reason, it is preferable that the diameters of the holes in the mesh are suitably adjusted. The suction apparatus 75 can be configured in such a manner that a closed box which has a desirably-sized open window is formed below the mesh belt 73, and in such a manner that air is absorbed from a portion other than the window and the inside of the window is under negative pressure relative to the air outside.

The rotary transfer of the mesh belt 73 transports the web W formed on the mesh belt 73 along a transportation direction (an outline-defined arrow in the drawing). An intermediate transportation unit 90 as a separation unit is arranged above the mesh belt 73. The web W is separated by the intermediate transportation unit 90 from the mesh belt 73, and is transported to the pressurizing unit 110 side. To be more precise, the separation unit (the intermediate transportation unit 90) that separates the accumulation material (the web W) from the moving portion (the mesh belt 73) is retained and the accumulation material (the web W) that results from the separation can be transported to the pressurizing unit 110. The intermediate transportation unit 90 is configured in such a manner that the intermediate transportation unit 90 can transport the web W vertically upward (a direction in which the web W is separated from the mesh belt 73) while absorbing the web W. The intermediate transportation unit 90 is arranged a distance away (in a direction perpendicular to a surface of the web W) from the mesh belt 73, and in the transportation direction of the web W, the mesh belt 73 and one portion are arranged out of touch with each other at the downstream side. Then, a transportation section for the intermediate transportation unit 90 is a section from the stretching roller 72 at the downstream side of the mesh belt 73 to the pressurizing unit 110.

The intermediate transportation unit 90 has a transportation belt 91, multiple stretching rollers 92, and an absorption room 93. The transportation belt 91 is an endless mesh belt on which a mesh that is stretched by the stretching roller 92 is formed. Then, at least one among the multiple stretching rollers 92 rotates about its axis and thus the transportation belt 91 is made to rotate (move) in one direction.

The absorption room 93 is arranged inside the transportation belt 91. The absorption room 93 is in the form of a hollow box that has an upper surface and four lateral surfaces that come in contact with the upper surface. A lower surface (a surface facing the transportation belt 91 that is positioned below the absorption room 93) of the absorption room 93 is opened. Furthermore, the absorption room 93 includes the absorption member that generates the air current (the absorption force) within the absorption room 93. Then, air within the absorption room 93 is absorbed by driving the absorption member, and thus air is introduced from the lower surface of the absorption room 93. Thus, the air current occurs that flows to an upper portion of the absorption room 93, the web W is absorbed from above the web W, and thus the web W can stick to the transportation belt 91. Then, the rotation of the stretching roller 92 about its axis moves (rotates) the transportation belt 91 and the web W can be transported toward the pressurizing unit 110. Furthermore, because the absorption room 93 is arranged at a position at the downstream side in such a manner that, when viewed from above, a portion of the absorption room 93 overlaps the mesh belt 73 and does not overlap the suction apparatus 75, the web W on the mesh belt 73 can stick to the transportation belt 91 that is separated from the mesh belt 73 at a position facing the absorption room 93. The stretching roller 92 rotates about its axis in such a manner that the transportation belt 91 moves at the same speed as the mesh belt 73. When there is a difference in speed between the mesh belt 73 and the transportation belt 91, the web W can be prevented from being stretched and thus damaged and buckled, by maintaining the same speed.

The pressurizing unit 110 is arranged at the downstream side of the intermediate transportation unit 90 in the transportation direction of the web W. The pressurizing unit 110 is configured from a pair of pressurizing rollers 111 and 112, and applies pressure to the web W that is transported. For example, the pressurizing unit 110 applies pressure to the web W that is formed on the accumulation unit 70 in such a manner that the web W will have approximately one fifth to one thirtieth of the current thickness of the web W. Thus, the strength of the web W can be improved.

The heating and pressurizing unit 120 is arranged at the downstream side of the pressurizing unit 110 in the transportation direction of the web W. The heating and pressurizing unit 120 applies heat and pressure to the web W as the accumulation materials accumulate in the accumulation unit 70, and binds the fibers that are included in the web W, through the use of the binders. The heating and pressurizing unit 120 according to the present embodiment is configured from a pair of heat application rollers 121 and 122. A heat application member such as a heater is provided to each central portion of rotational shafts of the heat application rollers 121 and 122. The web W is made to pass between the heat application rollers 121 and 122 in a pair, and thus heat and pressure can be applied to the web W that is transported. Then, the heat application rollers 121 and 122 in a pair apply the heat and the pressure to the web W, and thus the binder is melted and thus the binder and the fiber are mutually entangled and a distance between the fibers decreases, thereby increasing the number of contact points between the fibers.

As a cutting unit 130 that cuts the web W, a first cutting member 130a that cuts the web W along the transportation direction of the web W and a second cutting member 130b that cuts the web W in a direction intersecting the transportation direction of the web W are arranged at the downstream side in the transportation direction, of the heating and pressurizing unit 120. The first cutting member 130a, for example, is a slitter, and cuts the web W along predetermined cutting positions in the transportation direction of the web W. The second cutting member 130b, for example, is a rotary cutter, and cuts the successive webs W into sheet shapes along the cutting positions that are set to a predetermined length. Thus, a desirably-sized sheet Pr (web W) is formed. The sheet Pr that results from the cutting is loaded onto a stacker 160. Moreover, a configuration may be employed in such a manner that the successive webs W are wound, as they are, by a winding roller without the web W being cut. As described above, in the sheet manufacturing apparatus 1, the sheet Pr can be manufactured.

Furthermore, the detection unit 190 is provided to the sheet manufacturing apparatus 1 according to the present embodiment. The detection unit 190 detects information indicating a quantity of the sheets Pr (webs W) that are manufactured in the sheet manufacturing apparatus 1. As configurations of the detection unit 190, for example, a configuration in which the number of sheets Pr that are manufactured by the sheet manufacturing apparatus 1 is counted and thus the quantity of the sheets Pr (the webs W) is detected, a configuration in which a weight of the sheets Pr that are manufactured by the sheet manufacturing apparatus 1 is metered and thus the quantity of the sheets Pr (the webs W) is detected, a configuration in which an area of the sheets Pr that are manufactured by the sheet manufacturing apparatus 1 is measured and thus the quantity of the sheets Pr (the webs W) is detected, or the like can be applied. Furthermore, a configuration may be employed in which the detection units 190 with these configurations are suitably combined.

As the configuration in which the number of the sheets Pr (the webs W) that are manufactured by the sheet manufacturing apparatus 1 is counted and thus the quantity of the sheets Pr (the web W) is detected, a counter 190a, as a detection unit that measures the number of times that the second cutting member 130b is driven, is arranged in the second cutting member 130b of the sheet manufacturing apparatus 1. The counter 190a is connected to the control unit 500. Then, when a cutting command is transmitted from the control unit 500 to the second cutting member 130b, the second cutting member 130b performs an operation of cutting the web W. Then, due to the operation in which the second cutting member 130b cuts the web W (or due to the driving of the cutting member 130b), the counter 190a performs counting (the number of times that the cutting is performed). Then, cutting data is transmitted to the control unit 500. Thus, the number of the sheets Pr that are manufactured by the sheet manufacturing apparatus 1 is counted and thus the quantity of the sheets Pr (the webs W) can be detected with the counting of the total number of the manufactured sheets Pr.

Furthermore, as the configuration in which the weight of the sheets Pr that are manufactured by the sheet manufacturing apparatus 1 is metered and the quantity of the sheets Pr (the webs W) is detected, a weight measuring instrument 190b, as the detection unit, is arranged below the stacker 160 of the sheet manufacturing apparatus 1. The weight measuring instrument 190b is connected to the control unit 500. Then, a weight in a state in which the sheets Pr (the webs W) are loaded onto the stacker 160 is measured and data that is obtained by the measurement is transmitted to the control unit 500. Moreover, a weight of the stacker 160 itself is subtracted in advance from the weight that is measured, as weight data, by the weight measuring instrument 190b. Thus, the weight of the sheets Pr that are manufactured by the sheet manufacturing apparatus 1 is metered, and thus the quantity of the sheets Pr (the webs W) can be detected with the metering of the total weight of the measured sheets Pr.

Furthermore, as the configuration in which the area of the sheets Pr that are manufactured by the sheet manufacturing apparatus 1 are measured and the quantity of the sheets Pr (the webs W) is detected, a measurement unit is arranged that constitutes a detection unit which measures a length of the webs W that are transmitted on a path for transporting the web W that is positioned at the downstream side of the accumulation unit 70 in the transportation direction of the web W in the sheet manufacturing apparatus 1. According to the present embodiment, a rotation meter 190c that constitutes a detection unit that measures the number of times that the pressurizing roller 111 rotates is arranged in the pressurizing roller 111 of the pressurizing unit 110. That is, it is possible to detect the length of the web W that is transmitted by the pressurizing unit 110 (the pressurizing roller 111), from the number of times that the pressurizing roller 111 rotates. The rotation meter 190c is connected to the control unit 500. Then when the webs W (the sheets Pr) are transported, the pressurizing roller 111 rotates. Then, the number of times that the pressurizing roller 111 rotates is measured by the rotation meter 190c, and measurement data that is obtained by the measurement is transmitted to the control unit 500. In the control unit 500, the length of the webs W (the sheet Pr) is obtained by performing a computing operation of converting the number of times that is transmitted, and the area of the webs W is computed from the length of the webs W that is obtained by the conversion. Moreover, because a dimension (a width dimension of the web W) in a direction perpendicular to the transportation direction of the web W is well known, the area of the webs can be easily computed from the length of the webs W in the sheet manufacturing apparatus 1 according to the present embodiment. Thus, the area of the sheets that are manufactured by the sheet manufacturing apparatus 1 is calculated and the quantity of the sheets Pr (the webs W) can be detected with the total area of the manufactured sheets Pr.

Figure 3:
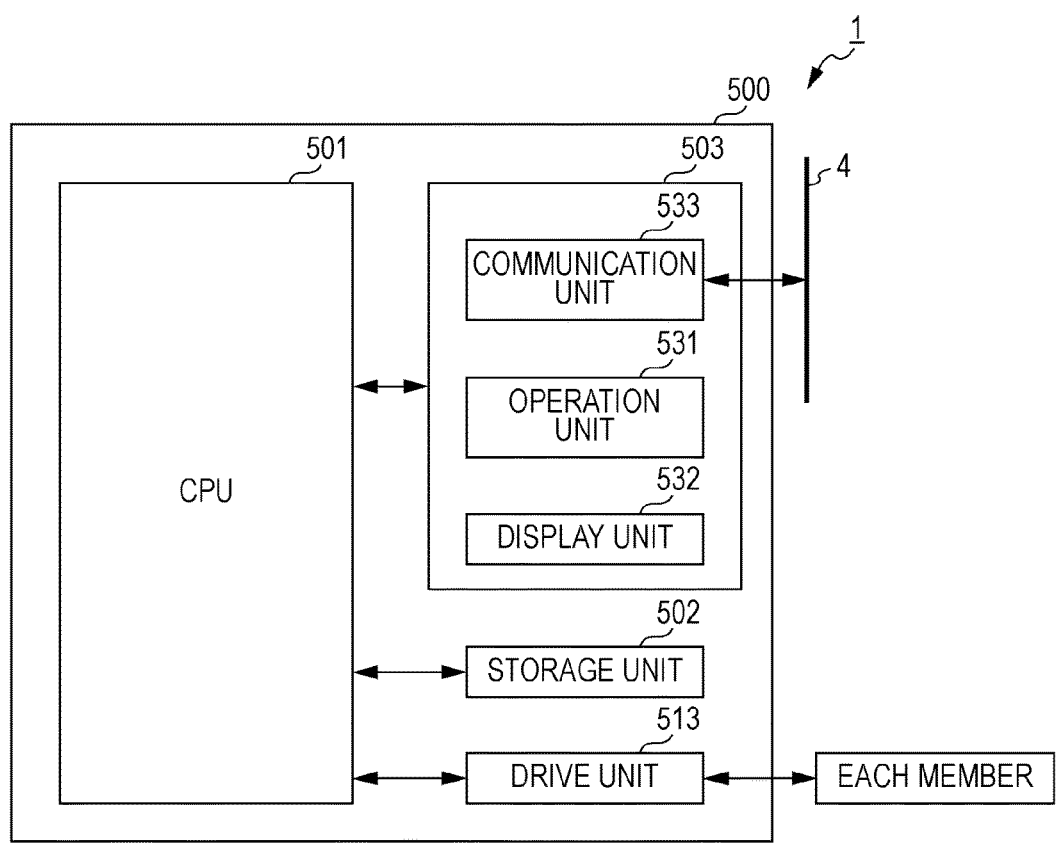
FIG. 3 is a block diagram illustrating a configuration of a control unit of the sheet manufacturing apparatus according to the first embodiment.

Next, a configuration of a control unit according to the sheet manufacturing apparatus is described. FIG. 3 is a block diagram illustrating the configuration of the control unit. As illustrated in FIG. 3, the control unit 500 includes a CPU 501 that controls each unit by executing a control program (firmware) that is stored in advance in a memory such as a ROM, a drive unit 513 that drives various members of the sheet manufacturing apparatus 1 according to a control command from the CPU 501, a storage unit 502 in which various pieces of operational information are stored, and an interface unit 503 through which information is exchanged with the outside.

As a configuration that is responsible for a user interface, the interface unit 503 includes an operation unit 531 that has keys (buttons) on which a user performs an input operation and a display unit 532 on which various pieces of information are displayed. Moreover, the operation unit 531 and the display unit 532, for example, may be integrated into one piece as a touch panel.

Additionally, the interface unit 503 includes a communication unit 533. The communication unit 533 has a network connection function for connection to the communication circuit 4. Then, the communication unit 533 is configured in such a manner that transmission of the operational information of the sheet manufacturing apparatus 1 to the server apparatus 2 through the communication circuit 4 is possible. Moreover, pieces of operational information include individual information (a specific ID) that specifies the sheet manufacturing apparatus 1, types of sheets Pr that are manufactured in the sheet manufacturing apparatus 1, a quantity of sheets Pr that are manufactured in the sheet manufacturing apparatus 1, a period of time (a period of time that is a target for calculating a billing charge) during which the sheets Pr are manufactured in the sheet manufacturing apparatus 1, and the like. Thus, among the multiple sheet manufacturing apparatuses 1 that are connected to the communication circuit 4, a target sheet manufacturing apparatus 1 can be easily specified and the quantity of the sheets Pr that are manufactured in the specified sheet manufacturing apparatus 1 can be acquired.

According to a control signal from the CPU 501, the drive unit 513 controls driving of each of the members (the supply unit 10, the crushing unit 20, the defibrating unit 30, the classification unit 40, the screening unit 50, the additive feeding unit 60, the accumulation unit 70, the heating and pressurizing unit 120, and the detection unit 190 (190a, 190b, and 190c) and the like of the sheet manufacturing apparatus 1.

Moreover, the sheet according to the embodiment described above refers mainly to a sheet form that a material including a fiber such as waste paper or pure pulp takes on. However, the form is not limited to the sheet form, and a board form or a web form (or a form of an uneven material) may be available. Furthermore, the material may be a plant fiber such as cellulose, a chemical fiber such as (polyethylene-telephthalate (PETG)) or polyester, or an animal fiber such as wool or silk. The sheet in the present application is divided into a sheet of paper and a sheet of non-woven fabric. Pieces of paper include a thin sheet of paper and the like, and include a piece of recording paper, a piece of wallpaper, a piece of wrapping paper, a piece of colored paper, a piece of Kent paper, and the like. The non-woven fabric is thicker than the paper, but has low strength. The pieces of non-woven fabric includes a piece of non-woven fabric, a fiber board, a piece of tissue paper, a paper towel, a cleaner, a filter, a liquid absorbing material, a sound absorbing material, a cushioning material, a mat and the like.

Furthermore, the piece of waste paper according to the embodiment described above mainly refers to paper on which a character, an image and the like are printed, but whatever has the form of a sheet of paper as a material is regarded as the piece of waste paper regardless of whether or not the sheet of paper is used.

Figures 4A, 4B:
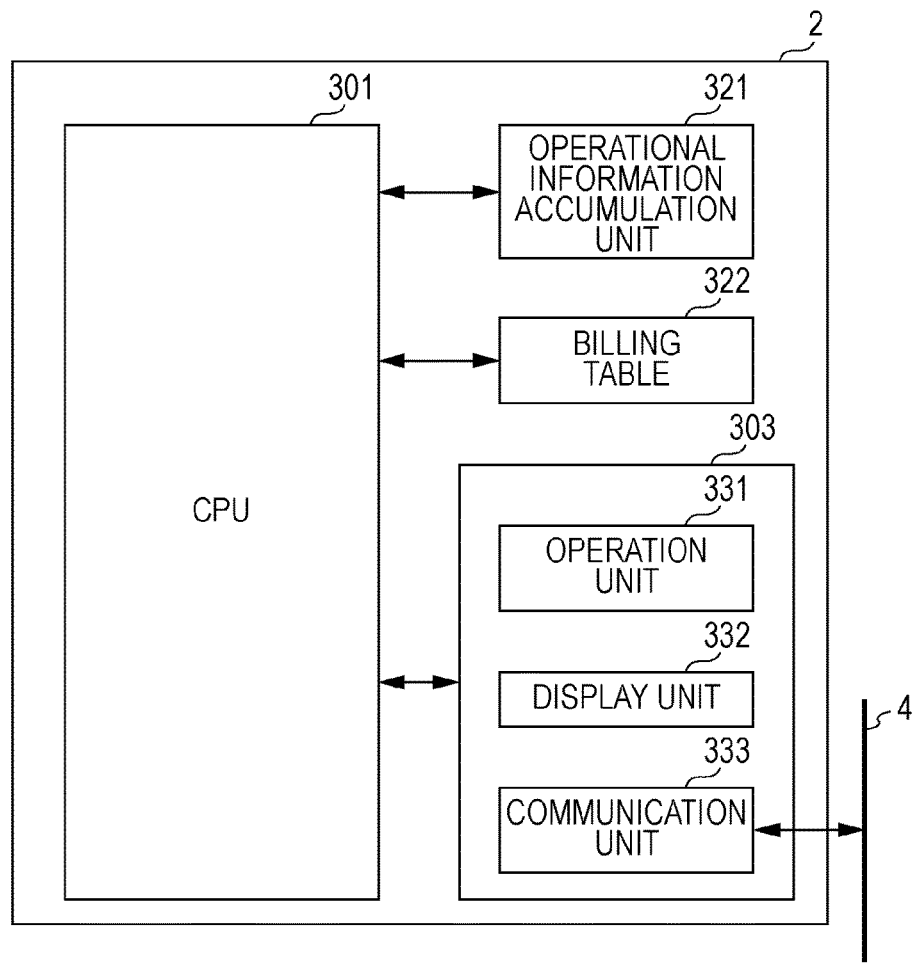
FIGS. 4A and 4B are schematic diagrams illustrating a configuration of a server apparatus according to the first embodiment.
Figure 5A:
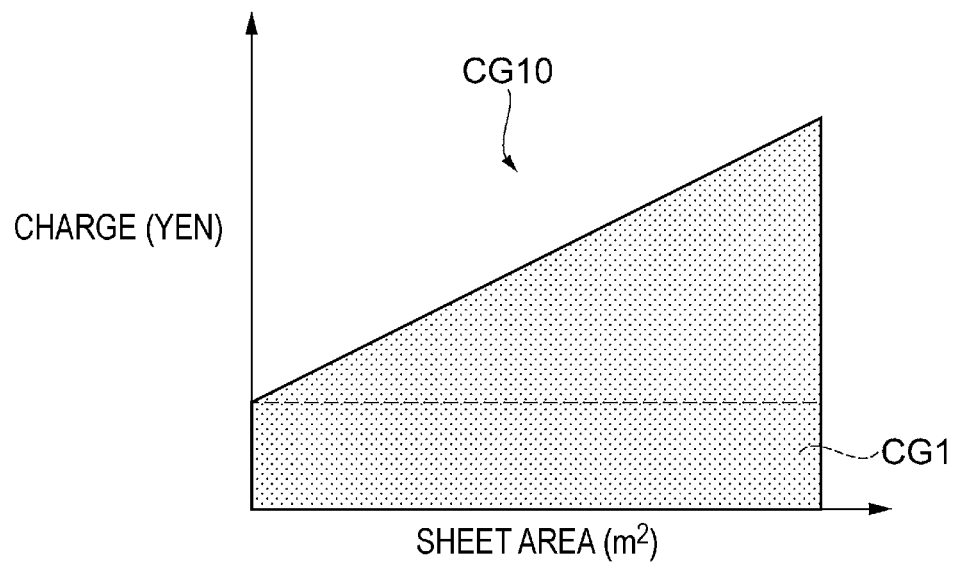
FIGS. 5A and 5B are schematic diagrams illustrating a type case of a billing charge for the sheet manufacturing apparatus according to the first embodiment.
Figure 5B:
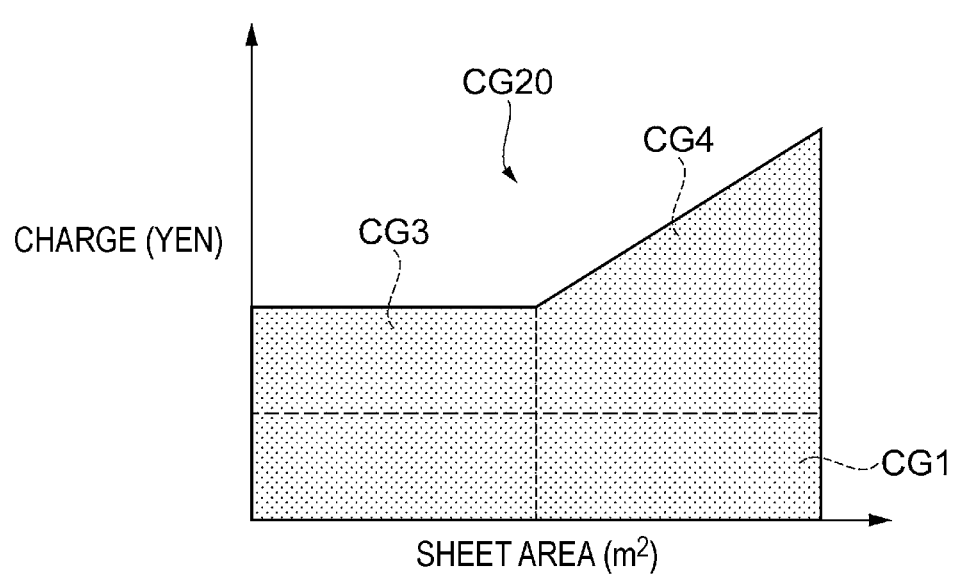

A configuration of the server apparatus is described. FIGS. 4A and 4B are schematic diagrams illustrating the configuration of the server apparatus. FIG. 4A is a block diagram illustrating the configuration of the server apparatus. FIG. 4B is charge data illustrating one example of a billing table. Furthermore, FIGS. 5A and 5B are schematic diagrams illustrating a type case of a billing charge for the sheet manufacturing apparatus. The server apparatus according to the present embodiment includes a billing charge calculation unit (a billing charge device) or the like that calculates the billing charge for the sheet manufacturing apparatus which manufactures the sheet Pr using the material including the fabric. A specific configuration will be described below.

The server apparatus 2 includes a CPU 301, an operational information accumulation unit 321 that builds a database of operational information, a billing table 322, an interface unit 303 through which information is exchanged with the outside, and the like.

The CPU 301 has a function of performing predetermined processing based on a control program that is set in advance. Additionally, the CPU 301 according to the present embodiment has some of the functions of the billing charge calculation unit as a calculation unit that calculates a billing charge according to a quantity of sheets Pr (webs W) that are manufactured in the sheet manufacturing apparatus 1.

For the configuration that is responsible for the user interface, the interface unit 303 includes an operation unit 331 that receives the operation input from the user (operator), and a display unit 332 on which various pieces of information are displayed in order to be reported to the user. The operation unit 331, for example, has an input device such as a keyboard or a mouse. The display unit 332, for example, has a display device such as a liquid crystal display. Furthermore, the interface unit 303 has a communication unit 333 for communicating with other apparatuses to perform exchange data. The communication unit 333 has a network connection function for connection to the communication circuit 4. Additionally, the communication unit 333 has some of the functions of the billing charge calculation unit as an acquisition unit that acquires information indicating the quantity of the sheets Pr (the webs W) that are manufactured in the sheet manufacturing apparatus 1.

Then, in the billing system 1000 according to the present embodiment, the operational information that includes information pertaining to a quantity of sheets which changes according to the operation of the sheet manufacturing apparatus 1 is transmitted from the sheet manufacturing apparatus 1 to the server apparatus 2 through the communication circuit 4. The server apparatus 2 stores the operational information of each sheet manufacturing apparatus 1 in the operational information accumulation unit 321. Thus, operational situations of each sheet manufacturing apparatus 1 and histories thereof accumulate in the server apparatus 2.

Then, in the server apparatus 2, a charge that includes a quantity-based charge that results from multiplying the quantity of the sheets Pr that are manufactured in the sheet manufacturing apparatus 1, by a charge per unit quantity is calculated as a billing charge. At this point, for the charge per unit quantity in the quantity of the sheets Pr that are manufactured in the sheet manufacturing apparatus 1, as illustrated in FIG. 4B, the billing table 322 is referred to in which the charge per unit quantity in the quantity of the manufactured sheets Pr is set in advance for every type of sheet that is manufactured. Moreover, in an example in FIG. 4B, charges for various consumable materials (a binder, coloring agent, functional agent 1, and functional agent 2) per unit area of each of the various sheets (sheet A, sheet B, and sheet C) that are manufactured in the sheet manufacturing apparatus 1 are set. Therefore, in the CPU 301 (the calculation unit), the billing charge is calculated using the charge data corresponding to a manufactured sheet class in the billing table 322, based on the quantity (the area of the sheets Pr) of the manufactured sheets Pr. Moreover, in an example in FIG. 4B, the billing table 322 that is available in a case where the area of the sheets is acquired as the quantity of the sheets is set, but no limitation to this is imposed. For example, in a case where the number of the sheets is acquired as the quantity of the sheets, a billing table pertaining to a quantity of consumable materials used, such as the binder, which are used per one manufactured sheet Pr may be set. Furthermore, in a case where the weight of the sheets is acquired as the quantity of the sheets, a billing table pertaining to a quantity of consumable materials, such as the binder, which are used per unit weight of one manufactured sheet Pr may be set. The billing charge can be easily calculated in this manner as well.

Furthermore, in a billing charge type CG 10, as illustrated in FIG. 5A, a quantity-based charge is calculated based on a quantity-based system in which a charge increases at a given rate according to the area of the manufactured sheets Pr. Moreover, FIG. 5A illustrates a type of billing charge in a case where a basic charge CG 1 of a given amount of money is included in the billing charge. Moreover, a type of charge in which the basic charge CG 1 is absent (0 Yen) in a billing charge CG 10 may be available. For example, a maintenance cost, an on-site service cost, or the like can be included in the basic charge CG 1.

Additionally, as illustrated in FIG. 5B, a charge type in which a fixed charge and a quantity-based charge is combined may be available as a different billing charge type CG 20. Specifically, in the server apparatus 2, in a case where the quantity of the manufactured sheets Pr is a predetermined quantity or less, a fixed charge CG 3 of a predetermined amount of money is set as the billing charge. In the server apparatus 2, in a case where the quantity of the manufactured sheets Pr exceeds the predetermined quantity, a charge that is obtained by adding the quantity-based charge, which is obtained by multiplying by a charge per unit quantity a quantity of the sheets Pr by which the predetermined quantity is exceeded, to the fixed charge CG 3 is calculated as a billing charge CG 4. FIG. 5B illustrates a billing charge type in which the basic charge CG 1 of a given amount of money is included in a billing charge type CG 20. Moreover, in this case, a charge type in which the basic charge CG 1 is absent (0 Yen) may be available. Furthermore, no limitation to the charge types that are illustrated in FIGS. 5A and 5B is imposed and various billing charge types may be set according to the quantity of the manufactured sheets Pr.

Figure 6:
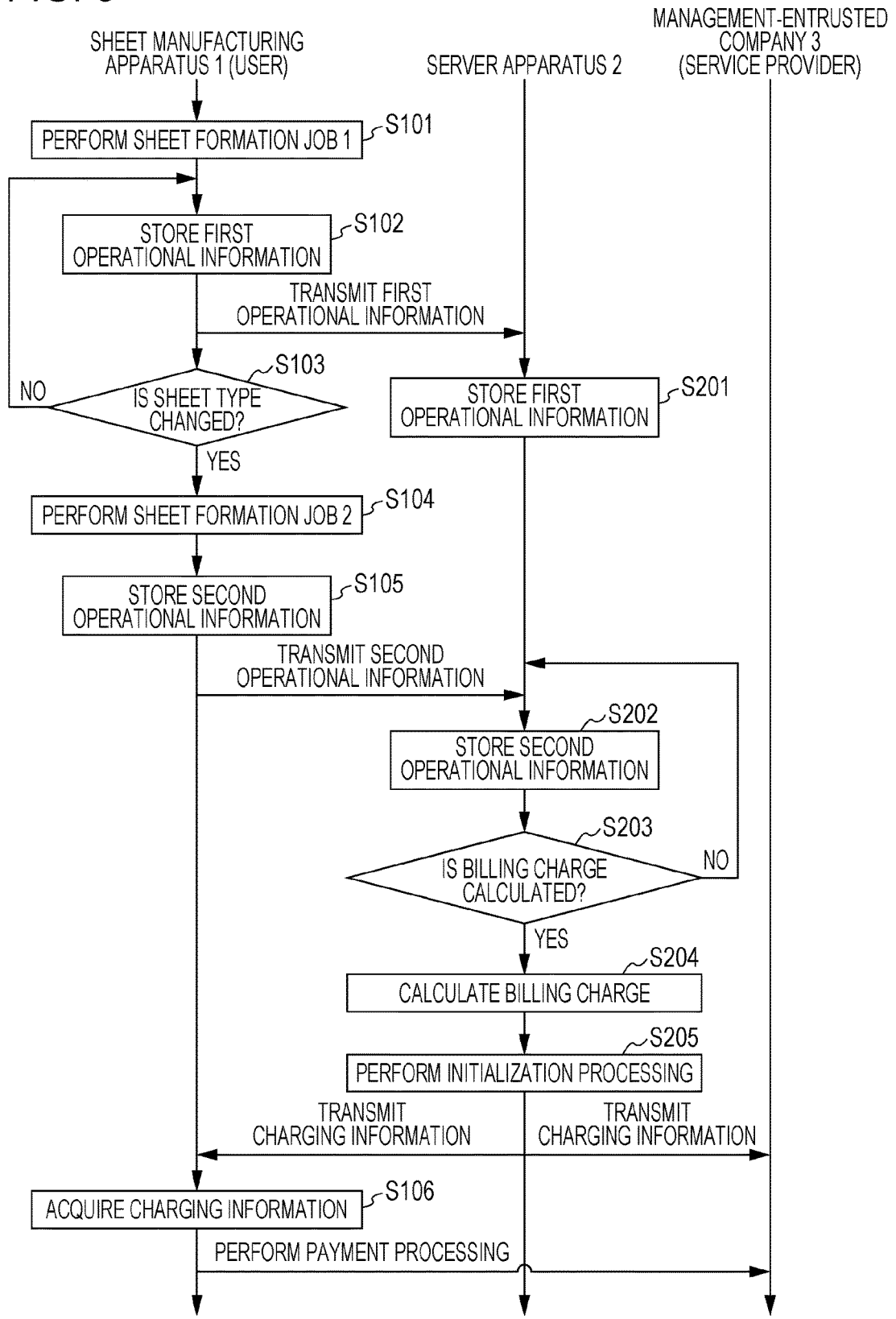
FIG. 6 is a flowchart illustrating a billing charge calculation method for use in the sheet manufacturing apparatus according to the first embodiment.

Next, a billing charge calculation method for use in the sheet manufacturing apparatus is described. FIG. 6 is a flowchart illustrating the billing charge calculation method for use in the sheet manufacturing apparatus. The billing charge calculation method for use in the sheet manufacturing apparatus is a billing charge calculation method for use in the sheet manufacturing apparatus that manufactures the sheets using the material including the fiber. The method includes a step (a) of acquiring the quantity of the manufactured sheets and a step (b) of calculating the billing charge according to the quantity of the manufactured sheets. In the step (b), a charge that includes a quantity-based charge which is obtained by multiplying the quantity of the manufactured sheets by a charge per unit quantity is calculated as the billing charge. Moreover, according to the present embodiment, a case where two different types of sheets that are the sheet class are manufactured in one sheet manufacturing apparatus 1 is described. A specific description thereof will be provided below.

First, sheet formation job 1 is performed in the sheet manufacturing apparatus 1 (Step S101). Specifically, the sheet class in which the user performs forming (manufacturing) is selected, and the selected sheet class is input using the operation unit 531 and is transmitted to the CPU 501. Then, the CPU 501 causes each member, which constitutes the sheet manufacturing apparatus 1, to be driven, based on the control program that corresponds to the selected sheet class. Thus, each member is driven, and the sheet Pr (the web W) is formed. Furthermore, in Step S101 according to the present embodiment, a step of acquiring the quantity of the manufactured sheets Pr (the webs W) is included.

As a method of acquiring the quantity of the manufactured sheets Pr (the webs W), for example, the number of the sheets Pr that are manufactured by the sheet manufacturing apparatus 1 can be applied to a method of acquiring the quantity of the sheets Pr (the webs W). Furthermore, the weight of the sheets Pr that are manufactured by the sheet manufacturing apparatus 1 can be applied to the method of acquiring the quantity of the sheets Pr (the webs W). Furthermore, the area of the sheets Pr that are manufactured by the sheet manufacturing apparatus 1 can be applied to the method of acquiring the quantity of the sheets Pr (the webs W).

Moreover, as a method of counting the number of the sheets Pr that are manufactured by the sheet manufacturing apparatus 1, the counter 190a that counts the number of times that the second cutting member 130b of the sheet manufacturing apparatus 1 is driven, and the number of times that the cutting (driving) that accompanies the operation (driving) in which the second cutting member 130b cuts the web W is performed is counted. Thus, the number of the sheets Pr that are manufactured by the sheet manufacturing apparatus 1 is counted and thus the quantity of the sheets Pr (the webs W) can be detected with the counting of the total number of the manufactured sheets Pr.

Furthermore, as a method of metering the weight of the sheets Pr that are manufactured by the sheet manufacturing apparatus 1, the weight measuring instrument 190b that is arranged below the stacker 160 of the sheet manufacturing apparatus 1 is driven, and the weight in a state where the sheets Pr (the webs W) are loaded on the stacker 160 is metered. Thus, the weight of the sheets Pr that are manufactured by the sheet manufacturing apparatus 1 is metered, and thus the quantity of the sheets Pr (the webs W) can be detected with the metering of the total weight of the measured sheets Pr.

Furthermore, as a method of measuring the area of the sheets Pr that are manufactured by the sheet manufacturing apparatus 1, the rotation meter 190c that measures the number of times that the pressurizing roller 111 which is arranged in the pressurizing unit 110 of the sheet manufacturing apparatus 1 rotates, the length of the transported (manufactured) webs W (the sheets Pr) is obtained by performing the computing operation that converts the measured number of times that rotation takes place, and the area of the webs W is computed from the length of the webs W that is obtained by the conversion. Thus, the quantity of the sheets Pr (the webs W) can be detected by the total area of the sheets Pr that are manufactured by the sheet manufacturing apparatus 1. The quantity of the sheets Pr (the webs W) that are manufactured is acquired using the methods described above.

Subsequently, first operational information is stored (Step S102). Specifically, the first operational information that accompanies the performing of sheet formation job 1 is stored in the storage unit 502. Pieces of first operational information include individual information (a peculiar ID) that specifies the sheet manufacturing apparatus 1, types of sheets Pr that are manufactured in the sheet manufacturing apparatus 1, a quantity of sheets Pr that are manufactured in the sheet manufacturing apparatus 1, a period of time (a period of time that is a target for calculating a billing charge pertaining to sheet formation job 1) during which the sheets Pr are manufactured in the sheet manufacturing apparatus 1, and the like. The quantity of the sheets Pr that are manufactured in the sheet manufacturing apparatus 1 is acquired with the number, the weight, and the area, and the like of the sheets Pr that are manufactured by the sheet manufacturing apparatus 1. Then, the first operational information is transmitted from the communication unit 533 to the server apparatus 2 through the communication circuit 4.

When the first operational information from the sheet manufacturing apparatus 1 is received in the server apparatus 2, the first operational information is stored in the operational information accumulation unit 321 for each of the sheet manufacturing apparatuses 1, and thus pieces of first operational information accumulate (Step S201).

Subsequently, in the sheet manufacturing apparatus 1, it is determined whether or not the sheet class is changed. That is, it is determined whether or not a change to sheet formation job 2 that is different from sheet formation job 1 in Step S101 is made (Step S103). In a case where the sheet class is not changed (NO), proceeding to Step S102 takes place. On the other hand, in a case where the sheet class is changed (YES), proceeding to Step S104 takes place.

In Step S104, sheet formation job 2 is performed in the sheet manufacturing apparatus 1. Specifically, the sheet class in which the user performs the forming (manufacturing) is selected (changed), and the selected sheet class (the sheet class that results from the change) is input using the operation unit 531 and is transmitted to the CPU 501. Then, the CPU 501 causes each member, which constitutes the sheet manufacturing apparatus, to be driven, based on the control program that corresponds to the selected sheet class (the sheet class that results from the change). Thus, each member is driven, and a different type of sheet Pr (web W) is formed.

Subsequently, second operational information is stored (Step S105). Specifically, the second operational information that accompanies the performing of sheet formation job 2 is stored in the storage unit 502. Pieces of second operational information include individual information (a specific ID) that specifies the sheet manufacturing apparatus 1, types of sheets Pr that are manufactured in the sheet manufacturing apparatus 1, a quantity of sheets Pr that are manufactured in the sheet manufacturing apparatus 1, a period of time (a period of time that is a target for calculating a billing charge pertaining to sheet formation job 2) during which the sheets Pr are manufactured in the sheet manufacturing apparatus 1, and the like. Furthermore, the second operational information is transmitted from the communication unit 533 to the server apparatus 2 through the communication circuit 4.

When the second operational information from the sheet manufacturing apparatus 1 is received in the server apparatus 2, the second operational information is stored in the operational information accumulation unit 321 for each of the sheet manufacturing apparatuses 1, and thus pieces of second operational information accumulate (Step S202).

Subsequently, it is determined whether or not the billing charge is calculated in the server apparatus 2 (Step S203). In a case where the billing charge is not calculated (NO), proceeding to Step S202 takes place. On the other hand, in a case where the billing charge is calculated (YES), proceeding to Step S204 takes place. Moreover, a configuration may be employed in such a manner that timing at which the billing charge is calculated is set in advance for every predetermined period of time (for example, every one method) and that the billing charge automatically begins to be calculated when the timing is reached.

Subsequently, in a case where the proceeding to S204 takes place, in the server apparatus 2, the billing charge is calculated according to the quantity of the manufactured sheets Pr. As the billing charge calculation method, the charge that includes the quantity-based charge that results from multiplying the quantity of the manufactured sheets Pr, by the charge per unit quantity is calculated as the billing charge. Additionally, in the case where the quantity of the manufactured sheets Pr is a predetermined quantity or less, a fixed charge of a predetermined amount of money is set as the billing charge. In the case where the quantity of the manufactured sheets Pr exceeds the predetermined quantity, a charge that is obtained by adding the quantity-based charge, which is obtained by multiplying by the charge per unit quantity the quantity of the sheets Pr by which the predetermined quantity is exceeded, to the fixed charge is calculated as the billing charge. Specifically, the billing charge is calculated referring to the billing table 322, based on the quantity of the sheets Pr pertaining to each sheet class from the operational information accumulation unit 321 in the server apparatus 2, which are manufactured in a target sheet manufacturing apparatus 1. According to the present embodiment, the billing charge pertaining to sheet formation job 1 is calculated referring to the billing table 322 that corresponds to the sheet class pertaining to sheet formation job 1, based on the quantity (the area of the manufactured sheets Pr) of the sheets Pr pertaining to sheet formation job 1. Additionally, the billing charge pertaining to sheet formation job 2 is calculated referring to the billing table 322 that corresponds to the sheet class pertaining to sheet formation job 2, based on the quantity (the area of the manufactured sheets Pr) of the sheets Pr pertaining to sheet formation job 2. Then, a total billing charge is calculated by adding the billing charge pertaining to sheet formation job 1 and the billing charging pertaining to sheet formation job 2. Moreover, the billing charges are made to correspond to the billing charge types CG 10 and CG 20, respectively, and the final billing charges are calculated.

Subsequently, in the server apparatus 2, initialization processing is performed (Step S205). Specifically, the first operational information and the second operational information that correspond to portions on which the calculation for billing processing is performed are initialized. Thus, double calculation of the billing charge can be prevented, and a double request can be prevented.

Subsequently, in the server apparatus 2, information on a request for payment of the billing charge is transmitted to the sheet manufacturing apparatus 1 (the user) and a manager 3 (a service provider).

Subsequently, in the sheet manufacturing apparatus 1, billing information is acquired (Step S106). Then, thereafter, the sheet manufacturing apparatus 1 (the user) performs processing that makes a payment to the manager 3 (the service provider), based on the billing information.

As described above, according to the present embodiment, the following effects can be obtained.

The billing charge is calculated according to the quantity of the sheets Pr that are actually manufactured in the sheet manufacturing apparatus. That is, the billing is not performed according to the quantity of the consumable materials that are used in processes of manufacturing the sheets. Thus, the quantity of the consumable materials that are consumed when the sheet manufacturing apparatus 1 starts to manufacture the sheets Pr (the webs W) and so forth is excluded from a billing target. Therefore, a sense of disadvantage that a customer feels can be alleviated, and a method of reasonably calculating the billing charge can be provided.

Second Embodiment

Next, a second embodiment is described. Moreover, according to the present embodiment, portions that distinguish the present embodiment from the first embodiment, that is, a configuration of the control unit of the sheet manufacturing apparatus and a configuration of the server apparatus are described. Because the other configurations are the same as those according to the first embodiment, descriptions thereof are omitted.

Figure 7:
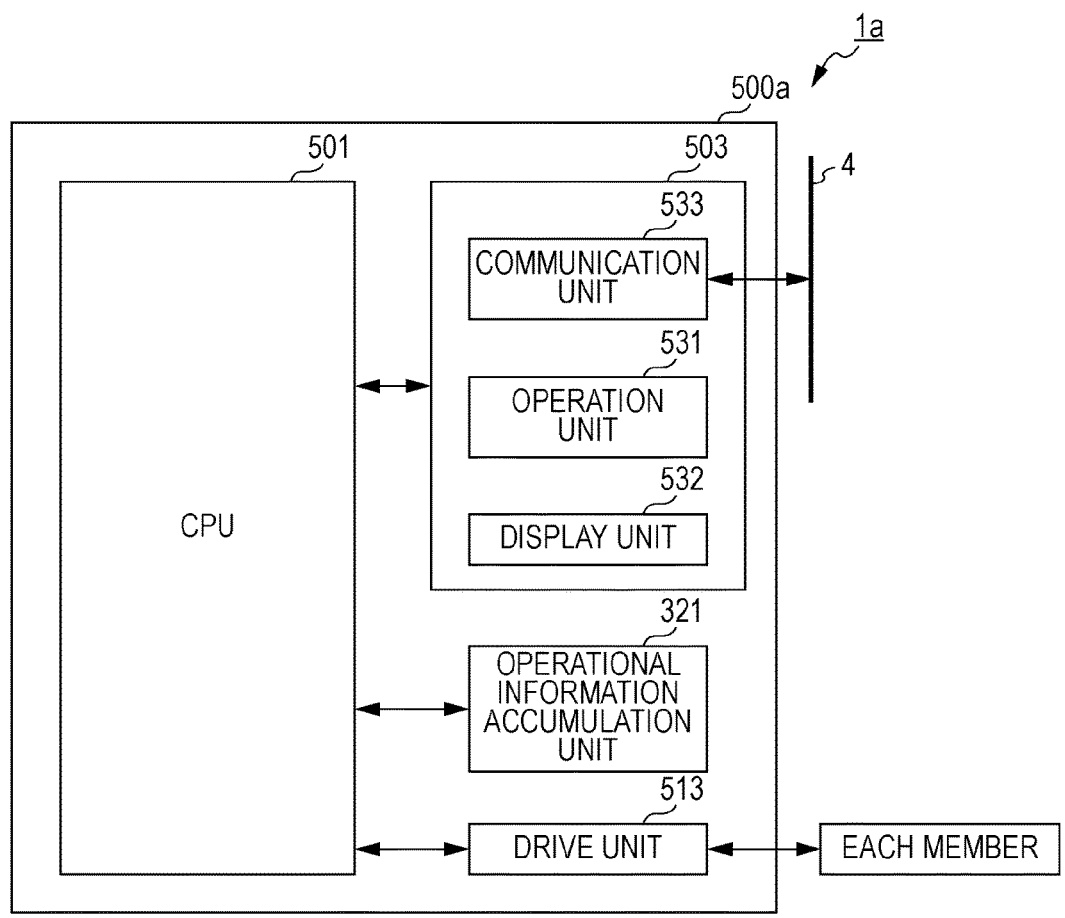
FIG. 7 is a block diagram illustrating a configuration of a control unit of a sheet manufacturing apparatus according to a second embodiment.

First, a configuration of a control unit of a sheet manufacturing apparatus according to the present embodiment is described. FIG. 7 is a block diagram illustrating the configuration of the control unit. As illustrated in FIG. 7, a control unit 500a of a sheet manufacturing apparatus 1a includes the CPU 501 that controls each unit by executing a control program (firmware) that is stored in advance in a memory such as a ROM, the drive unit 513 that drives various members of the sheet manufacturing apparatus 1a according to a control command from the CPU 501, the operational information accumulation unit 321 in which various pieces of data such as the operational information accumulate and thus database is built up, the interface unit 503 through information is exchanged with the outside, and the like.

As the configuration that is responsible for the user interface, the interface unit 503 includes the operation unit 531 that has keys (buttons) on which the user performs an input operation and the display unit 532 on which various pieces of information are displayed. Moreover, the operation unit 531 and the display unit 532, for example, may be integrated into one piece as the touch panel.

Additionally, the interface unit 503 includes the communication unit 533. The communication unit 533 has a network connection function for connection to the communication circuit 4. Then, the communication unit 533 is configured in such a manner that transmission of the operational information of the sheet manufacturing apparatus 1a to the server apparatus 2 through the communication circuit 4 is possible. Moreover, pieces of operational information include individual information (a specific ID) that specifies the sheet manufacturing apparatus 1a, types of sheets Pr that are manufactured in the sheet manufacturing apparatus 1a, a quantity of sheets Pr that are manufactured in the sheet manufacturing apparatus 1a, and a period of time during which the sheets Pr are manufactured in the sheet manufacturing apparatus 1a. Thus, among the multiple sheet manufacturing apparatuses 1a that are connected to the communication circuit 4, a target sheet manufacturing apparatus 1a can be easily specified and the quantity of the sheets Pr that are manufactured in the specified sheet manufacturing apparatus 1a can be acquired.

According to the control signal from the CPU 501, the drive unit 513 controls driving of each of the members (the supply unit 10, the crushing unit 20, the defibrating unit 30, the classification unit 40, the screening unit 50, the additive feeding unit 60, the accumulation unit 70, the heating and pressurizing unit 120, and the detection unit 190 (190a, 190b, and 190c) and the like of the sheet manufacturing apparatus 1a.

Furthermore, in the operational information accumulation unit 321, the operational information that includes information pertaining to the quantity of the sheets Pr that changes according to the operation of the sheet manufacturing apparatus 1a. Thus, operational situations of the sheet manufacturing apparatus 1a and histories thereof accumulate.

Figure 8:
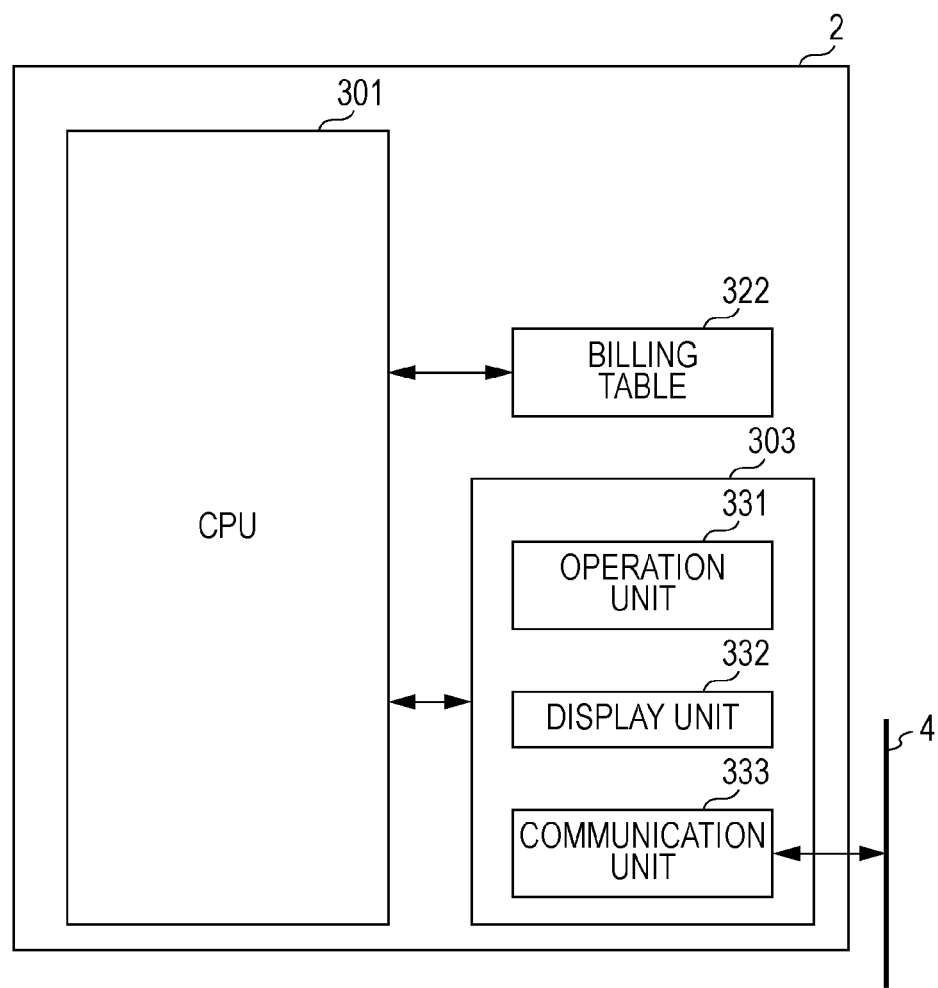
FIG. 8 is a block diagram illustrating a configuration of a server apparatus according to the second embodiment.

Next, a configuration of a server apparatus according to the present embodiment is described. FIG. 8 is a block diagram illustrating the configuration of the server apparatus. A server apparatus 2a includes the CPU 301 that performs predetermined processing, the interface unit 303 through which information is exchanged with the outside, the billing table 322, and the like.

The CPU 301 performs arithmetic operation processing based on a control program that is set in advance. Additionally, the CPU 301 according to the present embodiment has some of the functions of the billing charge calculation unit as a calculation unit that calculates a billing charge according to a quantity of manufactured sheets Pr (webs W).

For the configuration that is responsible for the user interface, the interface unit 303 includes the operation unit 331 that receives the operation input from the user, and the display unit 332 on which various pieces of information are displayed in order to be reported to the user. The operation unit 331, for example, has an input device such as a keyboard or a mouse. The display unit 332, for example, has a display device such as a liquid crystal display. Furthermore, the interface unit 303 has the communication unit 333 for communicating with other apparatuses to perform exchange data. The communication unit 333 has a network connection function for connection to the communication circuit 4. Additionally, the communication unit 333 has some of the functions of the billing charge calculation unit as the acquisition unit that acquires the information indicating the quantity of the sheets Pr (the webs W) that are manufactured in the sheet manufacturing apparatus 1a.

In the server apparatus 2a, a charge that includes a quantity-based charge that results from multiplying the quantity of the sheets Pr that are manufactured in the sheet manufacturing apparatus 1a, by a charge per unit quantity is calculated as a billing charge. When calculating the billing charge according to the present embodiment, the billing table 322 in which billing charge data is set in advance according to the manufactured sheet class is referred to. Thus, the billing charge can be easily calculated for every manufactured sheet class. Moreover, because a configuration of the billing table 322 is the same as that according to the first embodiment, a description thereof is omitted (refer to FIG. 4B).

Furthermore, because a type of billing charge is the same as that according to the first embodiment, a description thereof is omitted (refer to FIGS. 5A and 5B).

Next, the billing charge calculation method for use in the sheet manufacturing apparatus is described. FIG. 9 is a flowchart illustrating the billing charge calculation method for use in the sheet manufacturing apparatus. The billing charge calculation method for use in the sheet manufacturing apparatus is a billing charge calculation method for use in the sheet manufacturing apparatus that manufactures the sheets using the material including the fiber. The method includes a step (a) of acquiring the quantity of the manufactured sheets and a step (b) of calculating the billing charge according to the quantity of the manufactured sheets. In the step (b), a charge that includes a quantity-based charge which is obtained by multiplying the quantity of the manufactured sheets by s charge per unit quantity is calculated as the billing charge. Moreover, according to the present embodiment, a case where two different types of sheets that are the sheet class are manufactured one sheet manufacturing apparatus 1a is described. A specific description thereof will be provided below.

First, sheet formation job 1 is performed in the sheet manufacturing apparatus 1a (Step S301). Specifically, the sheet class in which the user performs forming (manufacturing) is selected, and the selected sheet class is input using the operation unit 531 and is transmitted to the CPU 501. Then, the CPU 501 causes each member, which constitutes the sheet manufacturing apparatus 1a, to be driven, based on the control program that corresponds to the selected sheet class. Thus, each member is driven, and the sheet Pr (the web W) is formed. Furthermore, in Step S301 according to the present embodiment, a step of acquiring the quantity of the manufactured sheets Pr (the webs W) is included.

As a method of acquiring the quantity of the manufactured sheets Pr (the webs W), for example, the number of the sheets Pr that are manufactured by the sheet manufacturing apparatus 1a can be applied to a method of acquiring the quantity of the sheets Pr (the webs W). Furthermore, the weight of the sheets Pr that are manufactured by the sheet manufacturing apparatus 1a can be applied to the method of acquiring the quantity of the sheets Pr (the webs W). Furthermore, the area of the sheets Pr that are manufactured by the sheet manufacturing apparatus 1a can be applied to the method of acquiring the quantity of the sheets Pr (the webs W).

Moreover, as a method of counting the number of the sheets Pr that are manufactured by the sheet manufacturing apparatus 1a, the counter 190a that counts the number of times that the second cutting member 130b of the sheet manufacturing apparatus 1a which is driven is driven, and the number of times that the cutting (driving) that accompanies the operation (driving) in which the second cutting member 130b cuts the web W is performed is counted. Thus, the number of the sheets Pr that are manufactured by the sheet manufacturing apparatus 1a is counted and thus the quantity of the sheets Pr (the webs W) can be detected with the counting of the total number of the manufactured sheets Pr.

Furthermore, a method of metering the weight of the sheets Pr that are manufactured by the sheet manufacturing apparatus 1a, the weight measuring instrument 190b that is arranged below the stacker 160 of the sheet manufacturing apparatus 1a is driven, and the weight in a state where the sheets Pr (the webs W) are loaded on the stacker 160 is metered. Thus, the weight of the sheets Pr that are manufactured by the sheet manufacturing apparatus 1a is metered, and thus the quantity of the sheets Pr (the webs W) can be detected with the metering of the total weight of the measured sheets Pr.

Furthermore, as a method of measuring the area of the sheets Rr that are manufactured by the sheet manufacturing apparatus 1a, the rotation meter 190c that measures the number of times that the pressurizing roller 111 which is arranged in the pressurizing unit 110 of the sheet manufacturing apparatus 1a rotates, the length of the transported (manufactured) webs W (the sheets Pr) is obtained by performing the computing operation that converts the measured number of times that rotation takes place, and the area of the webs W is computed from the length of the webs W that is obtained by the conversion. Thus, the quantity of the sheets Pr (the webs W) can be detected by the total area of the sheets Pr that are manufactured by the sheet manufacturing apparatus 1*a*. The quantity of the sheets Pr (the webs W) that are manufactured is acquired using the methods described above.

Subsequently, the first operational information is stored (Step S302). Specifically, the first operational information that accompanies the performing of sheet formation job 1 is stored in the operational information accumulation unit 321 of the control unit 500*a* of the sheet manufacturing apparatus 1*a*. Pieces of first operational information include individual information (a specific ID) that specifies the sheet manufacturing apparatus 1*a*, types of sheets Pr that are manufactured in the sheet manufacturing apparatus 1, a quantity of sheets Pr that are manufactured in the sheet manufacturing apparatus 1*a*, a period of time (a period of time that is a target for calculating a billing charge pertaining to sheet formation job 1) during which the sheets Pr are manufactured in the sheet manufacturing apparatus 1*a*, and the like. The quantity of the sheets Pr that are manufactured in the sheet manufacturing apparatus 1*a* is acquired with the number, the weight, and the area, and the like of the sheets Pr that are manufactured by the sheet manufacturing apparatus 1*a*. Thus, pieces of first operational information accumulate.

Subsequently, in Step S303, it is determined in the sheet manufacturing apparatus 1*a* whether or not the sheet class is changed. That is, it is determined whether or not a change to sheet formation job 2 that is different from sheet formation job 1 in Step S301 is made. In a case where the sheet class is not changed (No), proceeding to Step S 302 takes place. On the other hand, in a case where the sheet class is changed (YES), proceeding to Step S304 takes place.

In a case where the proceeding to Step S304 takes place, sheet formation job 2 is performed in the sheet manufacturing apparatus 1*a*. Specifically, the sheet class in which the user performs the forming (manufacturing) is selected (changed), and the selected sheet class (the sheet class that results from the change) is input using the operation unit 531 and is transmitted to the CPU 501. Then, the CPU 501 causes various members, which constitute the sheet manufacturing apparatus, to be driven, based on the control program that corresponds to the selected sheet class (the sheet class that results from the change). Thus, various members are driven, and a different type of sheet Pr (web W) is formed.

Subsequently, the second operational information is stored (Step S305). Specifically, the second operational information that accompanies the performing of sheet formation job 2 is stored in the operational information accumulation unit 321. Pieces of second operational information include individual information (a specific ID) that specifies the sheet manufacturing apparatus 1*a*, types of sheets Pr that are manufactured in the sheet manufacturing apparatus 1*a*, a quantity of sheets Pr that are manufactured in the sheet manufacturing apparatus 1*a*, a period of time (a period of time that is a target for calculating a billing charge pertaining to sheet formation job 2) during which the sheets Pr are manufactured in the sheet manufacturing apparatus 1*a*, and the like. Thus, pieces of second operational information accumulate.

Subsequently, it is determined in the sheet manufacturing apparatus 1*a* whether or not the billing charge is calculated (Step S306). In the case where the billing charge is not calculated (NO), proceeding to Step S305 takes place. On the other hand, in the case where the billing charge is calculated (YES), the operational information (the first operational information and the second operational information according to the present embodiment) that is a target for calculating the billing charge is transmitted from the communication unit 533 to the server apparatus 2*a* through the communication circuit 4. Moreover, a configuration may be employed in such a manner that timing at which the billing charge is calculated is set in advance for every predetermined period of time (for example, every one method) and that the operational information that is the target for calculating the billing charge is automatically transmitted to the server apparatus 2*a*.

Subsequently, in the case where the billing charge is calculated (YES), proceeding to Step S401 takes place and the billing charge is calculated according to the quantity of the sheets Pr that are manufactured in the server apparatus 2*a*. As the billing charge calculation method, the charge that includes the quantity-based charge that results from multiplying the quantity of the manufactured sheets Pr, by the charge per unit quantity is calculated as the billing charge. Additionally, in the case where the quantity of the manufactured sheets Pr is a predetermined quantity or less, a fixed charge of a predetermined amount of money is set as the billing charge. In the case where the quantity of the manufactured sheets Pr exceeds the predetermined quantity, a charge that is obtained by adding the quantity-based charge which is obtained by multiplying by the charge per unit quantity the quantity of the sheets Pr by which the predetermined quantity is exceeded to the fixed charge is calculated as the billing charge. Specifically, in the server apparatus 2*a*, the billing charge is calculated referring to the billing table 322, based on the quantity of the sheets Pr pertaining to each sheet class, which are manufactured in the target sheet manufacturing apparatus 1*a*, using the first operational information and the second operational information that are transmitted. According to the present embodiment, the billing charge pertaining to sheet formation job 1 is calculated referring to the billing table 322 that corresponds to the sheet class pertaining to sheet formation job 1, based on the quantity (the area of the manufactured sheets Pr) of the sheets Pr pertaining to sheet formation job 1. Additionally, the billing charge pertaining to sheet formation job 2 is calculated referring to the billing table 322 that corresponds to the sheet class pertaining to sheet formation job 2, based on the quantity (the area of the manufactured sheets Pr) of the sheets Pr pertaining to sheet formation job 2. Then, a total billing charge is calculated by adding the billing charge pertaining to sheet formation job 1 and the billing charging pertaining to sheet formation job 2. Moreover, the billing charges are made to correspond to the billing charge types CG 10 and CG 20, respectively, and the final billing charges are calculated.

Subsequently, in the server apparatus 2*a*, the initialization processing is performed (Step S402). Specifically, the operational information that corresponds to a portion on which the calculation for billing processing is performed is initialized. Thus, the double calculation of the billing charge can be prevented, and the double request can be prevented.

Subsequently, in the server apparatus 2*a*, information on a request for payment of the billing charge is transmitted to the sheet manufacturing apparatus 1*a* (the user) and the manager 3 (a service provider).

Subsequently, in the sheet manufacturing apparatus 1*a*, the billing information is acquired (Step S307). Then, thereafter, the sheet manufacturing apparatus 1*a* (the user) performs processing that makes a payment to the manager 3 (the service provider), based on the billing information.

As described above, according to the present embodiment, the following effects can be obtained.

In the sheet manufacturing apparatus 1a, the first operational information and the second operational information accumulate in the operational information accumulation unit 321, the first operational information and the second operational information that accumulate are transmitted to the server apparatus 2a, and the billing charge is calculated in the server apparatus 2a. According to the present embodiment, because the first operational information and the second operational information accumulate in the sheet manufacturing apparatus 1a, processing load can be reduced in the server apparatus 2a.

Moreover, the invention is not limited to the embodiments described above, and various modifications to and improvements on the embodiments described in detail are possible. Modification examples will be described below. The modification examples may be combined.

First Modification Example

According to the first and second embodiments, the server apparatuses 2 and 2a include the billing table 322, but no limitation to this configuration is imposed. For example, the billing table 322 as well as the operational information accumulation unit 321 may be arranged in the control units 500 and 500a of the sheet manufacturing apparatuses 1 and 1a. Although this is done, the same effects as described above can be obtained.

Second Modification Example

According to the first and second embodiments, the billing charge is calculated in the server apparatuses 2 and 2a, but no limitation to this configuration is imposed. For example, a configuration may be available in which the billing charge is calculated in the control units 500 and 500a of the sheet manufacturing apparatuses 1 and 1a. In this case, the CPU 501 is applied as the calculation unit that calculates the billing charge. Although this configuration is employed, the same effects as described above can be obtained.

The entire disclosure of Japanese Patent Application No. 2015-027284, filed Feb. 16, 2015 is expressly incorporated by reference herein.

What is claimed is:

1. A billing charge calculation method, the method comprising:
   manufacturing, using a manufacturing apparatus, sheets using a material including a fiber;
   detecting, by a detection unit of the manufacturing apparatus, a quantity of the manufactured sheets output out of the manufacturing apparatus;
   acquiring, by an acquiring unit of a host device in communication with the manufacturing apparatus, the quantity of the manufactured sheets; and
   calculating, by a calculation unit of the host device, a billing charge according to the quantity of the manufactured sheets output,
   wherein, in the calculating of the billing charge, a charge that includes a quantity-based charge which is obtained by multiplying the quantity of the sheets by a charge per unit quantity is calculated as the billing charge,
   wherein, in the calculating of the billing charge, in a case where the quantity of the sheets is a predetermined quantity or less, a fixed charge of a predetermined amount of money is set as the billing charge,
   wherein, in the calculating of the billing charge, in a case where the quantity of the sheets exceeds the predetermined quantity, a charge that is obtained by adding the quantity-based charge which is obtained by multiplying the charge per unit quantity by a quantity of the sheets by which the predetermined quantity is exceeded to the fixed charge is calculated as the billing charge, and
   wherein the quantity of the manufactured sheets output out of the manufacturing apparatus is at least one of: the number of the sheets that are manufactured by the sheet manufacturing apparatus, a weight of the sheets that are manufactured by the sheet manufacturing apparatus or an area of the sheets that are manufactured by the sheet manufacturing apparatus.

2. A billing system comprising:
   a sheet manufacturing apparatus that manufactures sheets using a material including a fiber; and
   a host device that is in communication with the sheet manufacturing apparatus,
   wherein the sheet manufacturing apparatus includes a detection unit that detects information indicating a quantity of the manufactured sheets output out of the manufacturing apparatus,
   wherein the host device includes:
      an acquisition unit that acquires information indicating the quantity of the manufactured sheets output, and
      a calculation unit that calculates a billing charge according to the quantity of the manufactured sheets,
   wherein the calculation unit calculates a charge that includes a quantity-based charge which is obtained by multiplying the quantity of the manufactured sheets by a charge per unit quantity, as the billing charge,
   wherein, in the calculating of the billing charge, in a case where the quantity of the sheets is a predetermined quantity or less, a fixed charge of a predetermined amount of money is set as the billing charge,
   wherein, in the calculating of the billing charge, in a case where the quantity of the sheets exceeds the predetermined quantity, a charge that is obtained by adding the quantity-based charge which is obtained by multiplying the charge per unit quantity by a quantity of the sheets by which the predetermined quantity is exceeded to the fixed charge is calculated as the billing charge, and
   wherein the quantity of the manufactured sheets output out of the manufacturing apparatus is at least one of: the number of the sheets that are manufactured by the sheet manufacturing apparatus, a weight of the sheets that are manufactured by the sheet manufacturing apparatus or an area of the sheets that are manufactured by the sheet manufacturing apparatus.

* * * * *